INVENTORS
RICHARD C. HUNGERFORD
BY FRANK E. BROWN
Eckhoff & Slick
ATTORNEYS

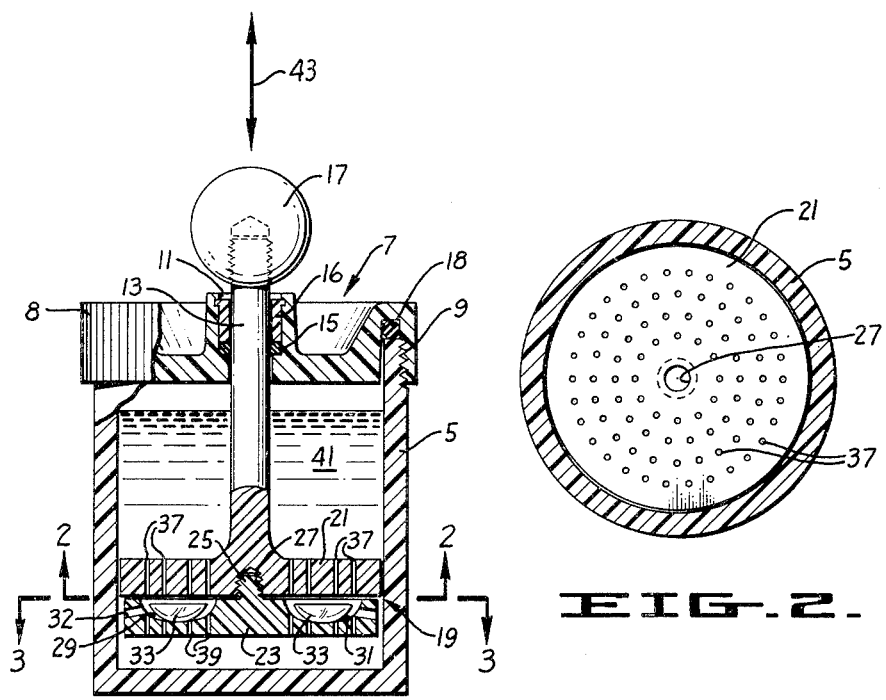
FIG. 1.
FIG. 2.
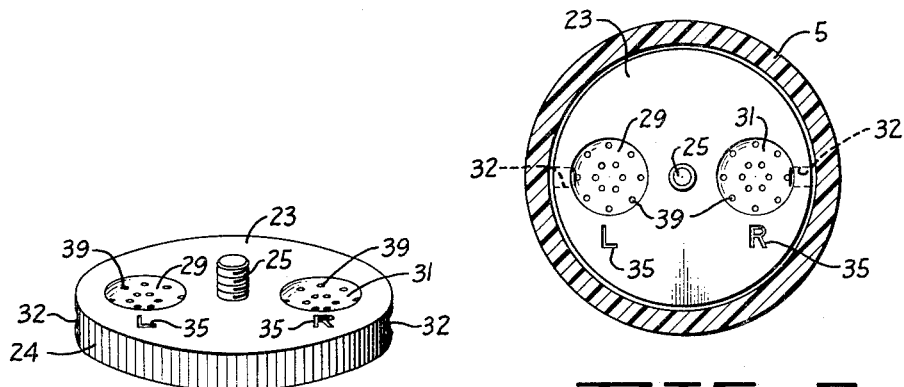
FIG. 4.
FIG. 3.
INVENTORS
RICHARD C. HUNGERFORD
FRANK E. BROWN
ATTORNEYS June 30, 1964 R. C. HUNGERFORD ETAL 3,139,097
CLEANSING DEVICE FOR CONTACT LENSES
Filed Nov. 28, 1962 3 Sheets-Sheet 2

June 30, 1964     R. C. HUNGERFORD ETAL     3,139,097
CLEANSING DEVICE FOR CONTACT LENSES Filed Nov. 28, 1962     3 Sheets-Sheet 3

INVENTORS
RICHARD C. HUNGERFORD
BY FRANK E. BROWN

Eckhoff & Slick
ATTORNEYS

United States Patent Office 3,139,097
Patented June 30, 1964

3,139,097
CLEANSING DEVICE FOR CONTACT LENSES
Richard C. Hungerford, Sunnyvale, and Frank E. Brown, Burbank, Calif., assignors to Barnes-Hind International, Inc., a corporation of California
Filed Nov. 28, 1962, Ser. No. 243,700
6 Claims. (Cl. 134—145)

This application is a continuation-in-part of our application Serial No. 157,157 filed December 5, 1961, now abandoned.

This invention relates to a cleansing device for contact lenses.

Heretofore, it has been the practice to clean contact lenses by rubbing them between the fingers, normally in the presence of a wetting solution such as the solution used for treating the lenses just prior to insertion in the eyes. This has a number of serious disadvantages. In the first place, the operation is time-consuming, since each lens must be cleansed separately. Secondly, this involves a large amount of handling of the lenses, with the attendant danger of loss and, since the lenses are physically rubbed between the fingers, there is always danger of abrading the lenses. The handling of the lenses with the fingers is further undesirable since the fingers are frequently not clean, so that irritating or infectious materials may be deposited on the lenses. Even clean fingers may deposit cell material which tends to cloud the lenses.

In accordance with the present invention, a washing device is provided for contact lenses which obviates all of the above-enumerated disadvantages.

The device of the present invention can be used as a mere washing device or it also can be used as a combined washing device and storage receptacle, although it is generally preferable to clean the lenses in a cleansing solution and then transfer them to a soaking solution until they are to be used.

In the drawings forming a part of this application:

FIGURE 1 is a side view of one device embodying the present invention, partially in section.

FIGURE 2 is a sectional view through the device on the lines 2—2 of FIGURE 1.

FIGURE 3 is a sectional view of the device on the lines 3—3 of FIGURE 1.

FIGURE 4 is a perspective view of the bottom portion of the piston which is used in the washing device of FIGURE 1.

Figure 5:
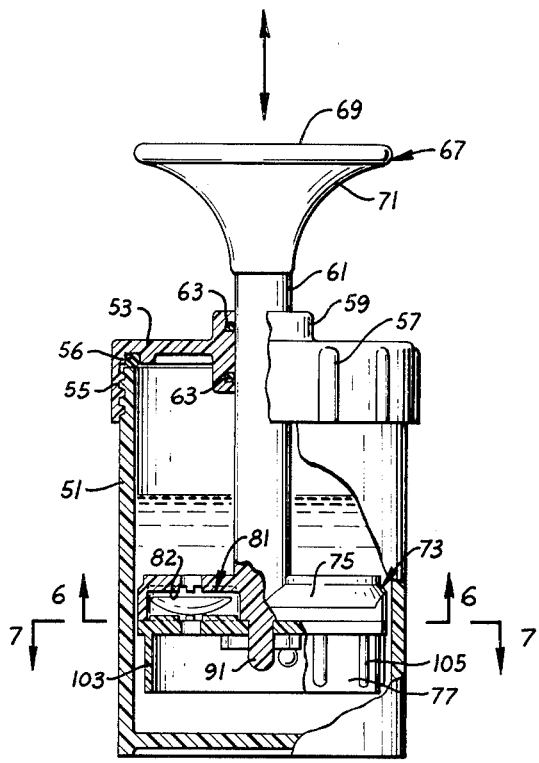
FIGURE 5 is a side view, partly in section, of another device embodying the invention.
Figure 6:
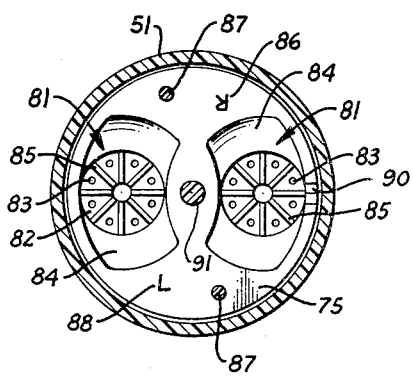
FIGURE 6 is a section on the lines 6—6 of FIGURE 5.
Figure 7:
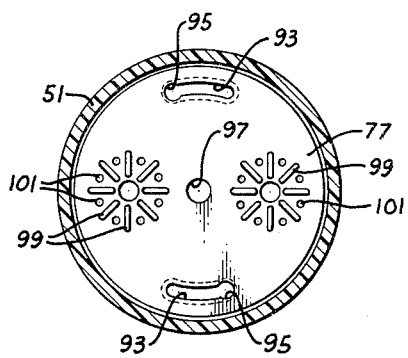
FIGURE 7 is a section on the lines 7—7 of FIGURE 5.
Figure 8:
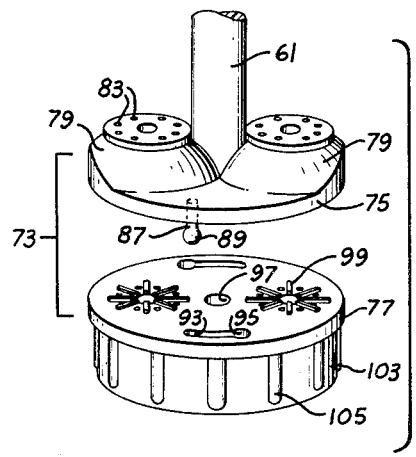
FIGURE 8 is a partial exploded view of the lens holding element.

Turning now to a description of the drawings by reference characters, and referring particularly to FIGURES 1 through 4, the washing device comprises a cup-like receptacle 5 which is preferably made of a clear plastic such as polypropylene. The device has a cover 7 which is preferably fastened to the cup 5 by means of mating threads 9, although other means of attachment may be used, such as a mating lip and notch, so that the cover may be merely snapped into place. The edge of the cover is preferably serrated as at 8 so as to provide a better gripping surface. At the center of the cover 7 is a round hole 11 to receive a piston rod 13. Preferably, the hole 11 is provided with a recess in which an O-ring 15 is placed to provide a better sealing action. The O-ring may be held in place by a collar 16. A gasket 18 prevents leakage at the edge of the cover. The piston rod 13 is provided with a handle 17 at its upper end so that it may be easily grasped, while the opposite end of the piston rod is provided with a composite piston generally designated 19, which piston is preferably of a soft plastic such as polyethylene or polypropylene so that the danger of scratching the lenses is obviated. The piston 19 comprises an upper portion 21 which is affixed to the shaft, and a lower portion 23 which is removably attached to the portion 21. One method of attachment comprises a threaded stud 25 on the lower portion 23 which can be screwed into mating threads 27 on the upper portion 21. Preferably, the lower portion 23 is slightly smaller in diameter than the upper portion so that all pumping action takes place on the upper portion, reducing strain on the threaded connection between the portions. The portion 23 is preferably serrated as at 24 to provide a better gripping surface. The lower portion 23 is dished as at 29 and 31, each of said dishes being adapted to receive a contact lens 33. Preferably, the lower portion also has indicia 35 so that the user will not confuse the lenses. This indicia may take the form of letters L and R, as shown, or can merely be a bar or arrow on the lower portion which will enable the user to orient the bottom portion in the same position when he is loading and unloading the device. The upper portion contains a plurality of holes 37, while similar holes 39 are provided under the dished-out portions 29 and 31 of the lower portion 23 of the piston. The holes 37 are preferably completely around the surface so that some holes will overlie the dished-out portions regardless of the exact positioning of the lower portion with respect to the upper portion. Larger holes 32 extend from each of the dishes to the edge of the portion 23 to permit drainage and to enable the washing solution to be washed out by holding the device under a stream of water.

In use, it is only necessary to separate the piston halves, place a contact lens in each of the dished-out portions 29 and 31, reassemble the piston by screwing the two halves together, and placing a suitable cleaning solution 41 in the cup, reassemble the piston and cover structure, and then reciprocate the handle 17 a few times, as is shown by the arrow 43. The lenses are thoroughly cleaned in a very short time without the usual danger of scratching or abrading the lenses.

The device shown in FIGURES 5 through 9 functions in a similar manner but is somewhat different structurally. The device here comprises a cup-like receptacle 51, preferably of a clear plastic. The device has a cover 53, preferably fastened to the cup 51 by mating threads 55, and has a gasket 56 to make it fluid-tight. The cover is preferably provided with a series of ridges 57 so that it may be easily grasped and turned, particularly when the hands are wet. A boss 59 is formed in the cover and this has a center opening to receive the piston rod 61. Preferably sealing means such as O-rings 63 are employed to make a fluid-tight seal. The piston rod 61 is provided with a handle 67 at its upper end. The top of the handle is flat as at 69 or at least has a flat rim thereon so that the piston and handle assembly can be inverted and stood upright on a flat surface for reasons which will be later apparent. The bottom portion of the handle is curved as at 71 so that it may be easily grasped by the fingers.

At the opposite end of the handle is a composite piston generally designated 73. The composite piston 73 is made up of an upper disc 75 and a lower disc 77. Preferably, the lower disc is slightly smaller than the upper disc so that only the upper disc can provide a pumping action.

The upper disc 75 has on its upper surface raised portions 79 which, from the opposite side, form the cavities generally designated 81. Each of the cavities has a flat bottom portion 82 just slightly larger than a contact lens with a sloping portion 84 leading therefrom to the surface so that a finger can easily be inserted in the cavity. The flat portion 82 has a series of holes 83 therein so that solution can pass through that portion of the piston. Further, the bottoms of the cavities preferably have ribs 85 which serve to keep lenses from sticking to the bottom of the cavity. The upper disc also has a plurality of rods 87 extending outwardly therefrom which terminate in knobs 89 and the disc also has a center projection 91.

The lower disc has a plurality of slots 93 each of which has an enlarged hole 95 at one end thereof and a central hole 97. The under surface of the upper disc preferably has indicia as at 86 and 88 designating the positions of the right and left lenses so they will not be confused. Additionally, a notch 90 can be provided opposite one of the lens cups so that the proper position of the lenses can be felt even by a user unable to see the indicia with his lenses off.

The upper surface of the lower disc has two series of ribs 99 and a plurality of holes 101 extend through the disc at these two points so that solution can pass therethrough. The lower disc also has a downturned lip 103 having a series of raised portions 105 thereon. The bottom lip 103 with its raised portions 105 enables one to easily grasp and rotate the lower disc. The bottom lip 103 also serves to direct water into the holes when the piston is held under a tap. It will be understood that the knobs 89 are of such size that they pass readily through the openings 95 and the discs can then be turned relative to each other so that the rods 87 are in the slots 93 at the opposite ends from the holes 95 and the two discs are then held together by the knobs 89. The center projection 91 enters the hole 97 serving both as a guide and to stabilize the structure. Although the rods and the projection have been described as being located in the upper disc, while corresponding slots and holes are in the lower disc, it is obvious that the locations could be reversed. The location of the ribs 99 and the holes 101 correspond, when the discs are in a locked position, to the relative locations of the ribs 85 and the holes 83. Thus, when the two discs are assembled, the sets of holes are brought into alignment, permitting liquid to pass through the cups which hold the lenses.

Figure 9:
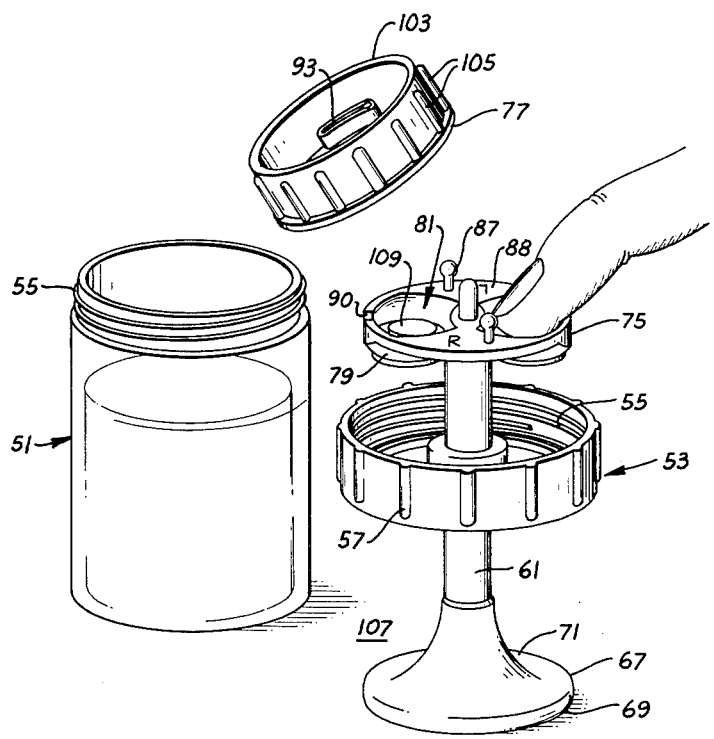
FIGURE 9 is a perspective view of the device shown in FIGURE 5 showing the manner in which the lenses are inserted and removed.

In FIGURE 9, the method of loading and unloading the device is shown. Here the cap 53 has been unscrewed from the cup 51 and the piston and handle assembly inverted and placed on a table or other support 107. The disc 77 is rotated slightly and pulled off. Since the diameter of the handle 67 is substantially the diameter of the piston, or can be even larger, there is no tendency for the structure to upset. In this position a lens 109 can be inserted in or removed from each of the cavities of disc 75.

Various cleansing solutions can be used in the device of the present invention. In the case of some cleansing solutions which are relatively mild and which will not attack the lenses, even on long contact, the device of the present invention can be used as both a storage and washing device. Thus, the lenses might be placed in the device night, the handle worked vigorously a few times, and the lenses allowed to stay in the solution until they are again required for use the next morning. If a relatively strong solution is used, the lenses would be washed in the strong solution for a relatively short length of time, removed and rinsed, and then stored in a soaking solution until the lenses were again needed. One convenient way of accomplishing this is to provide two of the containers 5, one of which may be provided with a plain cap. Thus, one of the containers 5 might contain a relatively strong washing solution, while the other container 5 contains a relatively mild soaking solution. The lenses would be first vigorously washed in the cleansing solution and the piston containing the lenses would then be rinsed under the tap and placed in the other container 5 in the relatively mild soaking solution until again required for use.

It is believed obvious that many variations can be made in the exact structure shown without departing from the spirit of our invention. For instance, the dished-out portions might be placed in the upper portion of the piston or the dished-out portions might be so shaped that lenses are on edge rather than flat. The piston may be made in the form of a cone, thus reducing the diameter of the device.

We claim:

1. A washing device for contact lenses comprising in combination:
   (a) a tubular container adapted to receive a cleansing solution;
   (b) a composite perforated piston fitting said container having a piston rod extending upwardly and terminating in a handle whereby the end of said handle can be grasped and moved to reciprocate the piston within said tubular container;
   (c) said composite piston comprising two mating discs in face-to-face contact, namely an upper disc which is attached to said handle and a lower disc which is connected to the upper disc;
   (d) locking means on said discs at points of contact of each of said discs for securing said discs in face to face contact;
   (e) each of said discs having holes therethrough so a solution can pass through the disc as the piston is moved in the tubular container; and
   (f) one of said discs having a plurality of dished out portions on the surface mating with the opposite disc, each dished out portion being adapted to receive a single contact lens.

2. The structure of claim 1 wherein the upper disc is larger than the lower disc.

3. A washing device for contact lenses comprising in combination:
   (a) a tubular container adapted to receive a cleansing solution; and
   (b) a composite perforated piston fitting said container having a piston rod extending upwardly and terminating in a handle whereby the end of said handle can be grasped and moved to reciprocate the piston within said tubular container;
   (c) said composite piston comprising two mating discs in face-to-face contact, namely an upper disc which is attached to said handle and a lower disc which is connected to the upper disc;
   (d) locking means on said discs at points of contact of each of said discs for securing said discs in face to face contact;
   (e) said upper disc having a pair of upwardly extending cavities in its under surface, said cavities having a series of small holes therethrough;
   (f) said lower disc being connected to said upper disc and having a series of holes therethrough corresponding in location to the holes in the upper disc.

4. The structure of claim 3 wherein each of the cavities has a flat bottom and has sloping sides.

5. The structure of claim 3 wherein one of the discs has rods projecting therefrom with knobs at the ends of the rods while the opposite disc has corresponding slots with one end of each slot enlarged whereby said knobs can pass through the enlarged portion but will be retained by the slots when the discs are rotated relative to each other.

6. The structure of claim 3 wherein the end of the handle has a flat rim so that the piston and piston rod can be inverted and placed on the flat rim of the handle.

References Cited in the file of this patent

UNITED STATES PATENTS

| | | |
|---|---|---|
| 448,654 | Jantz | Mar. 24, 1891 |
| 3,044,089 | Boynton | July 17, 1962 |
| 3,054,412 | Nickell | Sept. 18, 1962 |

FOREIGN PATENTS

| | | |
|---|---|---|
| 7,588 | Great Britain | of 1905 |